(12) United States Patent
Cai et al.

(10) Patent No.: US 11,375,010 B2
(45) Date of Patent: Jun. 28, 2022

(54) SHARDING BLOCK CHAIN GENERATION METHOD BASED ON TREE STRUCTURE

(71) Applicant: SHENZHEN UNIVERSITY, Shenzhen (CN)

(72) Inventors: Shubin Cai, Shenzhen (CN); Ningsheng Yang, Shenzhen (CN); Zhong Ming, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 10 days.

(21) Appl. No.: 16/972,988

(22) PCT Filed: Jul. 25, 2018

(86) PCT No.: PCT/CN2018/096932
§ 371 (c)(1),
(2) Date: Dec. 7, 2020

(87) PCT Pub. No.: WO2019/242059
PCT Pub. Date: Dec. 26, 2019

(65) Prior Publication Data
US 2021/0258375 A1 Aug. 19, 2021

(30) Foreign Application Priority Data
Jun. 20, 2018 (CN) .......................... 201810635232.2

(51) Int. Cl.
*H04L 67/1061* (2022.01)
*H04L 9/32* (2006.01)
(Continued)

(52) U.S. Cl.
CPC ........ *H04L 67/1068* (2013.01); *H04L 9/3236* (2013.01); *H04L 67/1046* (2013.01);
(Continued)

(58) Field of Classification Search
CPC ............. H04L 67/1068; H04L 67/1046; H04L 67/1057; H04L 67/1059; H04L 67/1076;
(Continued)

(56) References Cited

U.S. PATENT DOCUMENTS 10,102,265 B1 * 10/2018 Madisetti ............ G06F 16/1805
2017/0255950 A1 9/2017 Krug
(Continued)

FOREIGN PATENT DOCUMENTS

| CN | 106656974 A | 5/2017 |
| CN | 106878071 A | 6/2017 |

(Continued)

OTHER PUBLICATIONS

World Intellectual Property Organization (WIPO) International Search Report for PCT/CN2018/096932 dated Mar. 19, 2019 5 Pages.

*Primary Examiner* — Azizul Choudhury
(74) *Attorney, Agent, or Firm* — Anova Law Group, PLLC (57) ABSTRACT

Disclosed is a sharding block chain generation method based on a tree structure. Method comprises: dividing a server system into at least one group, and respectively selecting a leader of each group; packaging to generate at least one block by leader according to an own local database state, and broadcasting at least one block to all members of group in which leader is located; verifying consistency of at least one block, executing block according to a verification result of consistency, and synchronizing block to other groups. According to method, by means of tree grouping architecture, efficiency of generating block by a block chain framework is improved, block is generated according to own local database state of the leader, a resource waste phenomenon when block is generated in system is reduced, and delay when the block is generated is reduced.

8 Claims, 2 Drawing Sheets

(51) Int. Cl.
   *H04L 67/104*      (2022.01)
   *H04L 67/1074*     (2022.01)
   *H04L 9/00*        (2022.01)

(52) U.S. Cl.
   CPC ...... *H04L 67/1057* (2013.01); *H04L 67/1059* (2013.01); *H04L 67/1076* (2013.01); *H04L 67/1078* (2013.01); *H04L 9/50* (2022.05); *H04L 2209/463* (2013.01)

(58) Field of Classification Search
   CPC .............. H04L 67/1078; H04L 9/3236; H04L 2209/38; H04L 2209/463
   See application file for complete search history.

(56) References Cited

U.S. PATENT DOCUMENTS

| | | | |
|---|---|---|---|
| 2017/0323392 A1 | 11/2017 | Kasper et al. | |
| 2018/0336552 A1* | 11/2018 | Bohli | G06Q 20/065 |
| 2021/0089676 A1* | 3/2021 | Ford | H04L 9/0825 |

FOREIGN PATENT DOCUMENTS

| | | |
|---|---|---|
| CN | 106886560 A | 6/2017 |
| CN | 107395353 A | 11/2017 |
| CN | 107528886 A | 12/2017 |
| CN | 107766540 A | 3/2018 |

* cited by examiner

SHARDING BLOCK CHAIN GENERATION METHOD BASED ON TREE STRUCTURE

CROSS-REFERENCES TO RELATED APPLICATIONS

This application is a national stage application of PCT Patent Application No. PCT/CN2018/096932, filed on 25 Jul. 2018, which claims priority to Chinese Patent Application No. 201810635232.2, filed on 20 Jun. 2018, the content of all of which is incorporated herein by reference.

FIELD OF THE DISCLOSURE

The present disclosure relates to the technical field of block chain, in particular to a sharding block chain generation method based on a tree structure.

BACKGROUND

A block chain is a novel application mode of a plurality of computer technologies including a distributed data storage, a point-to-point transmission, a consensus mechanism, an encryption algorithm and more. A biggest feature of the block chain is no centralized service node needed. By means of the technology of the block chain, a manpower and a material resource to maintain a high-performance centralized equipment may be reduced. Decentralization means that there is no centralized configuration management node in a distributed service cluster responsible for determining an order of a plurality of messages in a network. However, a structure of decentralization, due to missing a configuration management center, makes it possible that a member node in the distributed service cluster has an inconsistent state between each other due to lack of a reliability of a network communication channel, thus the block chain has introduced a consistency protocol (a consensus algorithm), applied to processing a problem of a consistency of a decentralized distributed cluster.

A conventional consensus algorithm comprises 2PC, 3PC, paxo, and a series of algorithms derived based on the paxos algorithm. The consensus algorithm is applied to ensuring a consistency of a distributed system. However, the conventional consensus algorithm tends to generate a leader node in the cluster applied to reducing an amount of a plurality of messages the user sent to the cluster and determining an order of the messages. While a block chain system has no centralized node, a client needs to send a request thereof to all service nodes. But a non-reliable channel and a network delay may cause a view angle of each node inconsistent to a client request received, thus a consistency protocol of the block chain first needs to let a plurality of nodes inside the cluster determine an order of the client request, before deciding whether the client request can be executed.

The conventional block chain adopts an idea of electing a leader, and electing the leader and let the leader decide which client's request will be executed. In addition, in order to ensure a consistency and a verifiability of the system, the block chain takes a form of a single linked list to store the client requests that have been executed. In addition, in order to avoid an excessive centralization from the leader in the system, the conventional block chain adopts a mode of a proof of work to elect the leader. The service node will attempt to find a set of the client requests that meet a requirement according to a rule. At a same time, in order to ensure the consistency of the nodes in the block chain network, a consistency protocol based on a storage form of the single linked list requires a whole block chain service network to generate a set of the client requests at a time, and the block chain system requires to verify the set by using an one-way hash function each time when generating a set of the client requests, and only a set conforming to a requirement can be written into a database. Due to the one-way hash function having irreversibility, the service node can only find the set meeting the requirement violently in an exhaustive manner, but a process of finding the set is often time-consuming and costs a large amount of computing ability.

BRIEF SUMMARY OF THE DISCLOSURE

According to the above described defects, the purpose of the present disclosure is providing a sharding block chain generation method based on a tree structure.

A technical solution of the present disclosure to solve the technical problems is as follows:

A sharding block chain generation method based on a tree structure, wherein comprising:

dividing a server system into at least one group, and selecting a leader for each group respectively;

the leader packages and generates at least one block according to a local database state thereof, and broadcasts the at least one block to all members in the group therein;

verifying a consistency of the at least one block, and executing the block according to a verification result of the consistency, and synchronizing the block to a plurality of other groups.

The generation method, wherein the step of dividing a server system into at least one group, and selecting a leader for each group respectively, comprises specifically:

dividing the server system into at least one group according to a preset condition, wherein a number of a plurality of members in each group is a threshold having a preset number.

selecting a leader according to a proof of work of each member comprised in each group, wherein the leader is a member having a proof of minimum work.

The generation method, wherein the step of the leader packaging and generating at least one block according to a local database state thereof, and broadcasting the at least one block to all members in the group therein, comprises specifically:

the leader obtains a local database state thereof, and determines an executable client request and an execution sequence according to the local database state;

packaging and generating at least one block according to the executable client request and the execution sequence, and broadcasting the at least one block to all members in the group therein.

The generation method, wherein the step of verifying the consistency of the at least one block, and executing the block according to the verification result of the consistency, and synchronizing the block to a plurality of other groups, comprises specifically:

the leader generates a voting list corresponding to the block, and transmits the voting list to all members contained in the group therein, according to an order of a preset annular topological structure, to vote for each client request of the block;

the leader broadcast the voting list having the voting been completed to all of the members contained in the group, and determines the block corresponding to each group according to the voting list having been completed by voting, as well as synchronizes the blocks to a plurality of other groups.

The generation method, wherein after the step of verifying the consistency of the at least one block, and executing the block according to the verification result of the consistency, and synchronizing the block to the other groups, further comprising:

building a Merkel tree according to the block corresponding to each group, and calculating a hash value of a root of the Merkel tree;

determining a leader offset according to the hash value, and determining respectively a leader of each group in a next round according to the leader and the leader offset;

the leader of each group in the next round turning on the block in the next round repeatedly.

The generation method, wherein the step of determining a leader offset according to the hash value, and determining respectively a leader of each group in a next round according to the leader and the leader offset, comprising specifically:

performing a modulo operation to the hash value, according to a number of members contained in each group, to obtain a distance between the leader corresponding to each group and a leader in the next round;

determining the leader offset of each group according to each distance following a clockwise direction, and shifting each group leader according to the leader offset, to obtain the leader in the next round.

The generation method, wherein after the step of determining a leader offset according to the hash value, and determining respectively a leader of each group in a next round according to the leader and the leader offset, further comprising:

when receiving a request of a new member joining the servicer system, the new member queries all groups contained in the server system and the members contained in each group;

the new member completes the proof of work thereof, determines a corresponding group thereof according to the proof of work, and broadcasts the proof of work to all members contained in the group;

each member votes for the new member, and determines whether the new member will join the group, according to a voting result.

The generation method, wherein after the step of each member voting for the new member, and determining whether the new member will join the group, according to the voting result, comprising:

judging whether a split interval time of the server system has reached a preset time threshold or not, when a number of the members in the group has been monitored to reach a preset number;

when the preset time threshold is reached, each member contained in each group completes the proof of work thereof and broadcasts the proof of work to other members of the group;

the leader of each group divides the group therein into at least one sub-group according to the proof of work received following a preset condition, to generate a new group of the server system.

The generation method, wherein the step of the leader of each group dividing the group therein into at least one sub-group according to the proof of work received following a preset condition, to generate a new group of the server system, comprising specifically:

acquiring respectively a number of the members contained in each sub-group, and determining whether each sub-group satisfies a first sub-group of the preset condition according to the number of the members;

removing all the first sub-groups not satisfying the preset condition, to generate a new group of the server system.

The generation method, wherein after the step of the leader of each group dividing the group therein into at least one sub-group according to the proof of work received following a preset condition, to generate a new group in the server system, further comprising:

the leader obtains a number of the sub-groups divided in the group therein;

when the number of the sub-group is 1, synchronizes a request from a client contained in the group corresponding to the sub-group;

when the number of the sub-groups is greater than 1, distributing equally the request of the client contained in the group corresponding to the sub-group into each sub-group according to a generation sequence of the sub-group and a number of sub-groups.

Benefits: compared with the prior art, the application provides a sharding block chain generation method based on a tree structure, the method comprises: dividing a server system into at least one group, and selecting a leader for each group respectively; the leader packages and generates at least one block according to a local database state thereof, and broadcasts the at least one block to all members in the group therein; verifying a consistency of the at least one block, and executing the block according to the verification result of the consistency, and synchronizing the block to the other groups. The present method improves an efficiency of the block chain framework generating the blocks by the tree structure grouping architecture, and generates the blocks according to the local database state of the leader, improving a resource waste phenomenon when the system generates the blocks, and reducing a time delay generated when generating the blocks.

DETAILED DESCRIPTION OF EMBODIMENTS

The present disclosure provides a sharding block chain generation method based on a tree structure, in order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

Those skilled in the art will understand that, unless specifically claimed, otherwise the singular forms of "a", "an", "the" may also include a plural form. It should be further understood that, the term "comprising" used in the description of the present invention refers to a presence of the described features, integers, steps, operations, elements and/or components, but does not exclude the presence or addition of one or more other features, Integers, steps, operations, elements, components, and/or groups thereof. It should be understood that when an element is referred to as being "connected" or "coupled" to another element, it may be directly connected or coupled to the other element, or a plurality of intervening elements may also be present. Furthermore, "connected" or "coupled" as used herein may also include connected wirelessly or coupled wirelessly. As used herein, the term "and/or" includes all or any of the elements and all combinations of one or more of the associated listed items.

It can be understood by the skilled in the art that, unless otherwise defined, all terms (including technical and scientific terms) used herein have a same meaning as commonly understood by an ordinary skilled in the art to which this invention belongs. It should also be understood that terms such as those defined in a general dictionary should be understood to have meanings consistent with the meanings in the context of the prior art, and unless being specifically defined like herein, they would not be explained by an idealized or an overly formal meaning.

Further detailed descriptions of the present application are stated herein, referencing to the attached drawings and some preferred embodiments of the present application.

Figure 1:
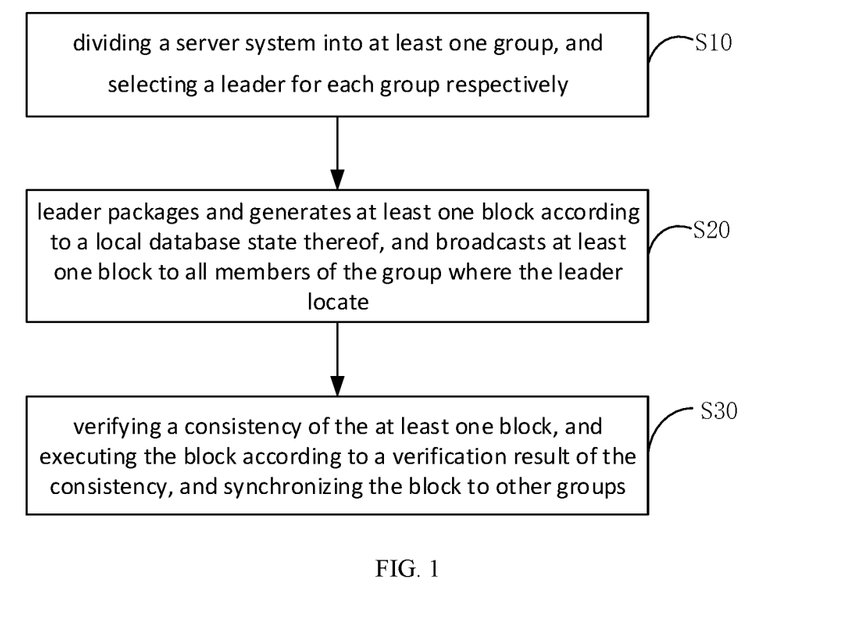
FIG. 1 illustrates a flowchart on one embodiment of the sharding block chain generation method based on the tree structure according to the present application.

Referencing to FIG. 1, which illustrates a flowchart on one embodiment of the sharding block chain generation method based on the tree structure according to the present application. The method comprises:

S10, dividing a server system into at least one group, and selecting a leader for each group respectively.

Specifically, the server system comprises a plurality of service nodes, that is, the server system comprises a plurality of members. Also, at any time, the server system has a ratio of a plurality of malicious-manipulated service nodes less than one-fourth. Dividing the server system into at least one group means dividing the server system into at least one group containing a preset number of members according to a preset condition. Correspondingly, the step of dividing a server system into at least one group, and selecting a leader for each group is specifically:

S11, dividing the server system into at least one group according to a preset condition, wherein a number of a plurality of members in each group is a threshold having a preset number;

S12, selecting a leader according to a proof of work of each member comprised in each group, wherein the leader is a member having a proof of minimum work.

Specifically, the preset condition is that a number of a plurality of members contained in each group is a threshold having a preset number, that is, the server system is divided into a plurality of groups containing a number of members less than a threshold having the preset number. And, when there is a group have a number of members less than the threshold having the preset number, all members contained in the group are evicted from the server system, before rejoining into the server system as a plurality of new members. In addition, the group refers to an original group in the server system, that is a root of a tree composed by the original group.

In addition, the leader is an initial leader in each group, which is obtained by selecting according to the proof of work. After a grouping is completed, each member in the group completes the proof of work, and an initial leader is selected according to the proof of work of each member in the group, and the block corresponding to the group is determined through the initial leader. In the present embodiment, the initial leader is a member having a proof of minimum work among all of the members contained in the group that the initial leader locates.

S20, the leader packages and generates at least one block according to a local database state thereof, and broadcasts the at least one block to all members of the group.

Specifically, the local database state may comprise a client request and a request order for the client request stored locally. The leader determines an executable client request based on the client request and a request order for the client request thereof, all of the executable client requests having been determined forms a block. In the present embodiment, the leader only considers the local database state thereof, so a problem of inconsistence in the request order of the client requests generated due to a network delay between each member may be avoided. In addition, before the leader packages and generates at least one block according to the local database state thereof, the leader receives and stores the client requests in a timestamp order, when a number of the client requests stored by the leader reaches a preset threshold, the leader scans all of the client requests stored therein and selects an executable client request, and generates a block according to all of the executable client requests selected. Accordingly, the leader packages and generates at least one block according to the local database state thereof, and broadcasts the at least one block to all members in the group therein, comprises specifically:

S21, The leader obtains the local database state thereof, and determines the executable client request and the execution sequence according to the local database state;

S22, Packaging and generating at least one block according to the executable client request and the execution sequence, and broadcasting the at least one block to all members in the group therein.

Specifically, the leader broadcasts the block to all members in the group therein. The members contained in the group may not be in a same network segment, thus the leader adopts a P2P technology to multicast, that is, the leader multicasts the block to all members in the group therein.

S30, verifying a consistency of the at least one block, and executing the block according to a verification result of the consistency, and synchronizing the block to a plurality of other groups.

Specifically, verifying the consistency refers to verifying all the client requests comprised in the block by each member, to determine whether each client request comprised in the block is an executable client request or not. The leader generates a voting list according to the block, and verifies the consistency of the block by each member filling the voting list in a sequence. Correspondingly, verifying the consistency of the at least one block, and executing the block according to the verification result of the consistency, and synchronizing the block to the other groups, comprising specifically:

S31, the leader generates a voting list corresponding to the block, and sequentially transmits the voting order to all members contained in the grouping according to a preset annular topological structure so as to vote the block containing all client requests;

S32, the leader broadcast the voting list having the voting been completed to all of the members contained in the group, and determines the block corresponding to each group according to the voting list having been completed by voting, as well as synchronizes the blocks to a plurality of other groups.

Specifically, the leader generates a voting list according to the block, and the voting list may have a structure similar to a block structure, comprising a head portion and a main body. Wherein the head portion of the voting list comprises a group wherein, and a hash value of a block corresponding to the voting list and a sequence of the block corresponding to the voting list generated in the group therein; and the main body of the voting list comprises an opinion on whether the client requests contained in the block are executable from each member node contained in the group corresponding to the voting list. In addition, in order to ensure that a malicious node cannot imitate the opinions of other member nodes, a fixed constant is not adopted herein to indicate agreement or disagreement, instead, the hash value of the client request is adopted to indicate agreement, and an inverse code of the hash value of the client request indicates disagreement. Thus each member may encrypt the hash value or the inverse code of the hash value by adopting a private key stored by the member itself, and an encrypted information may be written to the main body of the voting list.

In addition, The leader sends the voting list to a member locating thereafter according to a preset annular topological structure order, the leader may determine a following member according to a clockwise direction, may also determine the following member according to a counter-clockwise direction, and a delivery order determined by the leader is a voting order of the voting list, that is, the leader sends the voting list to a member afterwards according to an order of the annular topological structure, the member completes voting before sending the voting list to a member afterwards according to the order of the annular topological structure, and so on, until the voting list returns to the leader. Wherein the annular topological structure is determined according to a ranking result in a previous round of group splitting (eg, from small to large), and when the group is an initial group, the annular topological structure is determined according to the ranking result of the proof of work when the initial group is generated.

Further, when the voting list is transmitted along the annular topological structure before returned to the leader, the voting list has contained a voting from all the member nodes contained in the group corresponding to the voting list for each of the client requests in the block being able to execute or not, wherein the leader will vote yes to all of the client requests in the block when generating the voting list, and each member will vote for each client request in each block according to the local database state thereof. After receiving the voting list having the voting been completed, the leader will broadcast the voting list having the voting been completed to all of the members contained in the group, and each member will check independently a correctness and a legality of the voting list, according to an information of a public key of a corresponding node in a local record. If a result obtained by decrypting with the public key is the hash value or the inverse code of the hash value of the client request of a corresponding block, the voting of the voting list is determined to be valid and correct; and the client request obtaining an effective ticket number in the block will be executed. In the present embodiment, the effective ticket number refers to obtaining an agreement from at least over half members, and of course, the effective ticket number may be increased appropriately according to an actual condition.

In addition, the leader of each group will broadcast the block and a corresponding voting list generated by the group thereof in a present round to the leaders of a plurality of other groups. After waiting for a period of a synchronization time, all of the leaders will multicast a result of a synchronization block and the voting list received by utilizing the P2P technology, and all of the leaders will compare a result of the block synchronization, fill a possible missing and correct an error information. The synchronization time may be determined according to an application scenario of the server system and a member scale of the server system, wherein when the group is established, the leader of each group broadcasts a group member information contained in the group therein as a specific block into a whole server system, so that the member scale of the server system is determined. In a practical application, the synchronization time may be adjusted by adopting a moving average method, and the leader of the group may perform an adjustment according to the time of a previous synchronization block.

Further, the leader may adopt a bitmap method to indicate whether a block of a certain group has been received or not, then compares a plurality of received results according to the bitmap. At a same time, the leader broadcasts the block and the voting list synchronized by itself to the members of the group therein to synchronize the information between other members in the group. After receiving the block and the voting list, the member may verify independently and execute selectively the request in the block according to a result of the voting list.

Figure 2:
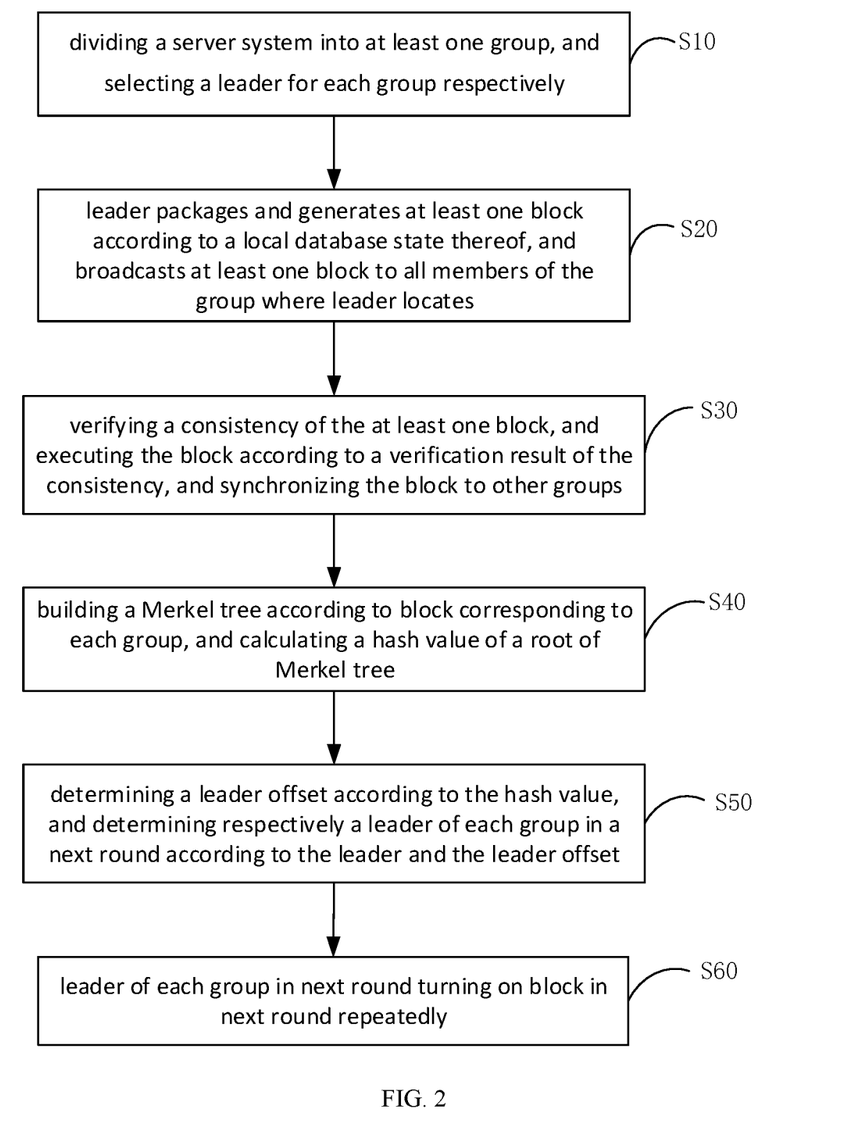
FIG. 2 illustrates a flowchart on another embodiment of the sharding block chain generation method based on the tree structure according to the present application.

In another embodiment of the application, as shown in FIG. 2, after verifying the consistency of the at least one block, and executing the block according to the verification result of the consistency, and synchronizing the block to other groups, further comprising:

S40, building a Merkel tree according to the block corresponding to each group, and calculating a hash value of a root of the Merkel tree;

S50, determining a leader offset according to the hash value, and determining respectively a leader of each group in a next round according to the leader and the leader offset;

S60, the leader of each group in the next round turning on the block in the next round repeatedly.

Specifically, the Merkel tree is a Merkel hash tree with a degree of 2, constructed by the blocks generated in all groups to be sorted by the groups in a traversal order (such as a first-order traversal) in the tree. And, when a certain groups cannot generate normally a block in this round of workflow or complete normally a synchronization of the blocks between groups due to an abnormal condition, other groups will fill a special empty block containing no client requests. The hash value of a tree root of the Merkel tree generated is subjected to a modulo operation, to obtain a leader of each group in the next round of work. Correspondingly, the step of determining a leader offset according to the hash value, and determining respectively a leader of each group in a next round according to the leader and the leader offset, comprising specifically:

S51, performing a modulo operation to the hash value, according to a number of members contained in each group, to obtain a distance between the leader corresponding to each group and a leader in the next round;

S52, determining the leader offset of each group according to each distance following a clockwise direction, and shifting each group leader according to the leader offset, to obtain the leader in the next round.

Specifically, the modulo operation is performed according to a number of the members in each group, that is, a result of the modulo operation is an offset at a clockwise direction in the annular topological structure of a new leader in a next round of work from a leader in the present work. In such a way, a tree-shaped group structure is utilized to determine an order of a plurality of blocks generated by different groups in each round, and determine an identity of the leader in each group according to the hash value of a sorting result, to ensure an unpredictability when selecting the leader, thus ensuring a randomness and a fairness.

In another embodiment of the present application, after determining the leader offset according to the hash value, and determining respectively the leader of each group in the next round according to the leader and the leader offset, further comprising:

S70, when receiving a request of a new member joining the servicer system, the new member queries all groups contained in the server system and the members contained in each group;

S80, the new member completes the proof of work thereof, determines a corresponding group therein according to the proof of work, and broadcasts the proof of work to all members contained in the group;

S90, each member votes for the new member, and determines whether the new member will join the group, according to a voting result.

Specifically, the new member sends a broadcast to the server system, and an information of the server system is queried through the broadcast, wherein the information of the server system may comprise all groups contained in the server system and the members contained in each group. After obtaining the information of the server system, a difficulty coefficient of the proof of work need to be completed is inquired through the broadcast, before finishing the proof of work. The proof of work is taking a hash value contained in the root of the Merkel tree constructed by all of the blocks generated by the system in a previous round as a seed, and adopting an one-way hash function of SHA 256 as an encryption function, the new member searches for a character string by taking the seed and an ID thereof as a basis, to make the hash value of a data obtained by splicing the seed, the ID and the character string meet the difficulty coefficient (that is, a number of prefix zeros of the hash value of the data), and when the new member finds the character string, the proof of work is completed.

Further, after the new member completes the proof of work, a group to be added for the new member is determined according to the proof of work, and the proof of work is sent to the members contained in the group corresponding to the new member. The leader of the group of the new member to be added determines an order of the new member according to a ranking order of the proof of work received, and sends a result of the proof of work received to other member nodes in a time sequence received before sending to other member nodes in a process of generating the blocks in the group, while a voting result will determine which of new members can join the group. When the group decides to accommodate a new member into a candidate list of a next round of group splitting, the leader of the group will broadcast the new member to the leaders of the other groups, then the leaders of the other groups will broadcast and notify the members in the group therein that the new member to join the server system has joined a network of the server system and a corresponding order thereof.

Additionally, in order to prevent a Sybil Attack, an upper limit of a number of the new members that can be accepted by each group shall not exceed a preset number. In one embodiment, a group that meets a split condition in the server system will generate at most 2 new sub-groups each time in a spit (wherein an original group disappears after the split), then a number of the members that the group can accommodate is more than twice of the threshold having the preset number, and the upper limit of the number of the members that the group can accommodate may be restricted according to a plurality of application scenarios, in one embodiment, the number of the members that the group can accommodate is less than three times of the threshold having the preset number.

In one more embodiment of the application, after each member voting for the new member, and determining whether the new member will join the group, according to the voting result, comprising:

S100, judging whether a split interval time of the server system has reached a preset time threshold or not, when a number of the members in the group has been monitored to reach a preset number;

S110, when the preset time threshold is reached, each member contained in each group completes the proof of work thereof and broadcasts the proof of work to other members of the group;

S120, the leader of each group divides the group therein into at least one sub-group according to the proof of work received following a preset condition, to generate a new group in the server system.

Specifically, the preset time threshold is preset and applied to determining whether the server system has reached a split requirement or not. That is, when a time-period of a current group in the server system has reached a preset time threshold, it means that the server system has reached a requirement of a split time. In the present embodiment, setting a split condition comprises the number of the members in the group reaching a threshold having a preset number, and a split interval time of the server system from last round of group splitting reaching a preset time threshold. When at least one group in the server system reaches the split condition, the group reached the split condition will generate a designated block, and request the server system to enter a split state through the designated block. When the designated block applied to controlling the server system to enter a group split state is generated in the server system, the server system will stop a process of generating the block in a next round and perform a split and reassemble to an existing group in the system by a method of introducing the proof of work. A hash function seed of the proof of work when the group is splitting is derived from a value of the root of the Merkel tree formed by a result obtained when the system generating the blocks in a last round. The member in a splitting group broadcasts the result of the proof of work thereof to all members in the group therein after completing the proof of work, a member performs a sort to a result after receiving the result of the proof of work from other members, and after receiving a standard number of the proof of work being able to compose the group, the leader divides the members into a new group and packs an information of the group into a block before sending to other nodes according to a notice of generating a normal block, after receiving the proof of work that has a standard number being able to compose a group. After receiving a block containing the information of the new group, each member checks a correctness independently before updating a local group information thereof.

Further, after the group splitting is completed, a number of the members in each sub-group obtained by a strict splitting is required to ensure that the number of the members in each sub-group is a preset number. Accordingly, as an embodiment, the leader of each group divides the group therein into at least one sub-group according to the proof of work received following a preset condition, to generate a new group in the server system, comprising specifically:

acquiring respectively a number of the members contained in each sub-group, and determining whether each sub-group satisfies a first sub-group of the preset condition according to the number of the members;

removing all the first sub-groups not satisfying the preset condition, to generate a new group in the server system.

Specifically, the preset condition is that the number of members is a preset number. That is, after splitting and obtaining the sub-groups, the number of members in each sub-group is verified in turn, that is, obtaining the number of the members in each sub-group respectively, before comparing each of the number of the members with a preset number, to determine a first sub-group that does not satisfy the preset condition, before removing all of the first sub-groups that do not satisfy the preset condition. Evicting all of the members in the first sub-group that do not satisfy the preset condition and rejoining the server system as a plurality of new members, it may ensure a number of a plurality of initial members in each sub-group obtained by splitting to be the preset number. In addition, after the group splitting is completed, each sub-group obtained by splitting selects an initial leader in a proof of work manner, decides randomly a leader in the next round by adopting an offset method in a block generation process.

Further, after the group splitting is completed, it is needed to divide a client request corresponding to the group according to the number of sub-groups obtained by splitting. Accordingly, after the leader of each group divides the group therein into at least one sub-group according to the proof of work received following a preset condition, to generate a new group in the server system, further comprising:

the leader obtains a number of the sub-groups divided in the group therein;

when the number of the sub-group is 1, synchronizes a request from a client contained in the group corresponding to the sub-group;

when the number of the sub-groups is greater than 1, distributing equally the request of the client contained in the group corresponding to the sub-group into each sub-group according to a generation sequence of the sub-groups and a number of the sub-groups.

Specifically, if the group generates only one new group during the splitting, the new group will inherit all mapping rules that the original group processes the client request. If the group is split into a plurality of sub-groups, the sub-groups will divide a mapping relationship of the original group according to the sequence and the number when generating the sub-groups. The mapping relationship of the new sub-groups must be a non-empty subset of the mapping relationship of the original group, and the mapping relationship between different sub-groups does not intersect each other. After the system completes the group splitting, the client can not know a change of the mapping relationship at a first time, so the client will still send a request thereof according to an expired local mapping cache. When a member in the original group receives a request from the client, if the original group generates at least one sub-group, then there must be a sub-group able to respond to the request. The member in the original group will inform the client the change of the mapping relationship of the original group at this time. In this way, the client does not have to update a local cache at a first time, and meanwhile, the client does not have to update a variation of the mapping relationship immediately in a whole service network, instead, only a change involved in a current request is updated. The mode can avoid a broadcast storm caused possibly by a conventional block chain adopting a grouping idea causing the client to broadcast the request to the whole service network due to a naive grouping.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. A sharding block chain generation method based on a tree structure, wherein comprising:

dividing a server system into at least one group, and selecting a leader for each group respectively;

the leader packages and generates at least one block according to a local database state thereof, and broadcasts the at least one block to all members in the group therein;

verifying a consistency of the at least one block, and executing the block according to a verification result of the consistency, and synchronizing the block to a plurality of other groups;

building a Merkel tree according to the block corresponding to each group, and calculating a hash value of a root of the Merkel tree;

determining a leader offset according to the hash value, and determining respectively a leader of each group in a next round according to the leader and the leader offset, comprising:

performing a modulo operation to the hash value, according to a number of members contained in each group, to obtain a distance between the leader corresponding to each group and a leader in the next round;

determining the leader offset of each group according to each distance following a clockwise direction, and shifting each group leader according to the leader offset, to obtain the leader in the next round;

the leader of each group in the next round turning on the block in the next round repeatedly.

2. The generation method according to claim 1, wherein the step of dividing a server system into at least one group, and selecting a leader for each group respectively, comprises specifically:

dividing the server system into at least one group according to a preset condition, wherein a number of a plurality of members in each group is a threshold having a preset number, selecting a leader according to a proof of work of each member comprised in each group, wherein the leader is a member having a proof of minimum work.

3. The generation method according to claim 1, wherein the step of the leader packaging and generating at least one block according to a local database state thereof, and broadcasting the at least one block to all members in the group therein, comprises specifically:

the leader obtains a local database state thereof, and determines an executable client request and an execution sequence according to the local database state;

packaging and generating at least one block according to the executable client request and the execution sequence, and broadcasting the at least one block to all members in the group therein.

4. The generation method according to claim 1, wherein the step of verifying the consistency of the at least one block, and executing the block according to the verification result of the consistency, and synchronizing the block to the other groups, comprises specifically:

the leader generates a voting list corresponding to the block, and transmits the voting list to all members contained in the group therein, according to an order of a preset annular topological structure, to vote for each client request of the block;

the leader broadcast the voting list having the voting been completed to all of the members contained in the group, and determines the block corresponding to each group according to the voting list having been completed by voting, as well as synchronizes the blocks to a plurality of other groups.

5. The generation method according to claim 1, wherein after the step of determining a leader offset according to the hash value, and determining respectively a leader of each group in a next round according to the leader and the leader offset, further comprising:

when receiving a request of a new member joining the servicer system, the new member queries all groups contained in the server system and the members contained in each group;

the new member completes the proof of work thereof, determines a corresponding group thereof according to the proof of work, and broadcasts the proof of work to all members contained in the group;

each member votes for the new member, and determines whether the new member will join the group, according to a voting result.

6. The generation method according to claim 5, wherein after the step of each member voting for the new member, and determining whether the new member will join the group, according to the voting result, comprising:

judging whether a split interval time of the server system has reached a preset time threshold or not, when a number of the members in the group has been monitored to reach a preset number;

when the preset time threshold is reached, each member contained in each group completes the proof of work thereof and broadcasts the proof of work to other members of the group;

the leader of each group divides the group therein into at least one sub-group according to the proof of work received following a preset condition, to generate a new group of the server system.

7. The generation method according to claim 6, wherein the step of the leader of each group dividing the group therein into at least one sub-group according to the proof of work received following a preset condition, to generate a new group of the server system, comprising specifically:

acquiring respectively a number of the members contained in each sub-group, and determining whether each sub-group satisfies a first sub-group of the preset condition according to the number of the members;

removing all the first sub-groups not satisfying the preset condition, to generate a new group of the server system.

8. The generation method according to claim 6, wherein after the step of the leader of each group dividing the group therein into at least one sub-group according to the proof of work received following a preset condition, to generate a new group in the server system, further comprising:

the leader obtains a number of the sub-groups divided in the group therein;

when the number of the sub-group is 1, synchronizes a request from a client contained in the group corresponding to the sub-group;

when the number of the sub-groups is greater than 1, distributing equally the request of the client contained in the group corresponding to the sub-group into each sub-group according to a generation sequence of the sub-group and a number of sub-groups.

* * * * *